United States Patent
Green et al.

(10) Patent No.: US 8,005,792 B2
(45) Date of Patent: Aug. 23, 2011

(54) SYSTEM AND METHOD FOR MANAGING VERSIONS OF METADATA

(75) Inventors: Russell John Green, San Carlos, CA (US); Subhransu Basu, Fremont, CA (US); Shrikanth Shankar, Mountain View, CA (US); Kumar Rajamani, Santa Clara, CA (US); Ho Chak Hung, Redwood City, CA (US); Jaebock Lee, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 307 days.

(21) Appl. No.: 11/129,717

(22) Filed: May 13, 2005

(65) Prior Publication Data

US 2006/0004886 A1 Jan. 5, 2006

Related U.S. Application Data

(60) Provisional application No. 60/571,361, filed on May 14, 2004, provisional application No. 60/571,362, filed on May 14, 2004.

(51) Int. Cl.
*G06F 7/00* (2006.01)
(52) U.S. Cl. ........................................ 707/638
(58) Field of Classification Search .................. 707/1, 2, 707/4, 9, 100, 102, 200, 201, 203; 709/200, 709/213
See application file for complete search history.

(56) References Cited

U.S. PATENT DOCUMENTS

| | | | | |
|---|---|---|---|---|
| 5,325,523 | A * | 6/1994 | Beglin et al. | 707/200 |
| 6,112,024 | A * | 8/2000 | Almond et al. | 717/122 |
| 6,226,788 | B1 * | 5/2001 | Schoening et al. | 717/107 |
| 6,289,358 | B1 * | 9/2001 | Mattis et al. | 707/203 |
| 6,366,917 | B1 * | 4/2002 | St. John Herbert, III | 707/100 |
| 6,502,108 | B1 * | 12/2002 | Day et al. | 707/203 |
| 6,564,263 | B1 * | 5/2003 | Bergman et al. | 709/231 |
| 6,584,476 | B1 * | 6/2003 | Chatterjee et al. | 707/203 |
| 6,718,436 | B2 | 4/2004 | Kim et al. | |
| 6,839,724 | B2 * | 1/2005 | Manchanda et al. | 707/203 |
| 6,915,313 | B2 * | 7/2005 | Yao | 707/203 |
| 7,028,057 | B1 * | 4/2006 | Vasudevan et al. | 707/203 |
| 7,092,972 | B2 * | 8/2006 | Kashyap | 707/203 |
| 7,130,957 | B2 * | 10/2006 | Rao | 711/3 |
| 7,174,372 | B1 * | 2/2007 | Sarkar | 709/223 |
| 7,203,709 | B2 * | 4/2007 | Long et al. | 707/203 |
| 2003/0069902 | A1 * | 4/2003 | Narang et al. | 707/203 |
| 2003/0110175 | A1 * | 6/2003 | Yao | 707/100 |
| 2003/0120868 | A1 * | 6/2003 | Royer et al. | 711/133 |

(Continued)

OTHER PUBLICATIONS

Office Action Dated Nov. 24, 2008 for U.S. Appl. No. 11/129,617.

(Continued)

*Primary Examiner* — Pierre M Vital
*Assistant Examiner* — Christopher P Nofal
(74) *Attorney, Agent, or Firm* — Vista IP Law Group, LLP.

(57) ABSTRACT

Versioned metadata allows multiple versions of metadata for a given object to exist concurrently on a system thereby supporting the parallel execution of operations which would otherwise be mutually exclusive. Metadata updates are permitted while other objects maintain access to another version of the metadata through a versioning infrastructure. The versioning infrastructure allows the creation of new versions of metadata, maintains obsolete versions in the system as long as they are being used by any object, and deletes the obsolete versions once they are no longer in use.

27 Claims, 5 Drawing Sheets

U.S. PATENT DOCUMENTS

| | | | |
|---|---|---|---|
| 2003/0195866 A1* | 10/2003 | Long et al. | 707/1 |
| 2003/0212717 A1* | 11/2003 | Kashyap | 707/203 |
| 2004/0107183 A1* | 6/2004 | Mangan | 707/2 |
| 2004/0210582 A1* | 10/2004 | Chatterjee et al. | 707/9 |
| 2004/0210607 A1* | 10/2004 | Manchanda et al. | 707/203 |
| 2005/0125461 A1* | 6/2005 | Filz | 707/203 |
| 2005/0149583 A1* | 7/2005 | Baskaran et al. | 707/203 |
| 2006/0020620 A1* | 1/2006 | Iyer et al. | 707/102 |
| 2006/0190500 A1* | 8/2006 | Rao et al. | 707/203 |
| 2006/0253497 A1* | 11/2006 | Abali et al. | 707/200 |
| 2006/0259518 A1* | 11/2006 | Lomet et al. | 707/201 |
| 2007/0050366 A1* | 3/2007 | Bugir et al. | 707/9 |
| 2007/0050382 A1* | 3/2007 | Bugir et al. | 707/100 |
| 2007/0162486 A1* | 7/2007 | Brueggemann et al. | 707/102 |
| 2007/0297458 A1* | 12/2007 | Narayanan et al. | 370/503 |
| 2008/0005184 A1* | 1/2008 | Myllyla et al. | 707/200 |

OTHER PUBLICATIONS

Office Action Dated Jun. 18, 2008 for U.S. Appl. No. 11/129,617.
Non Final Office Action Dated May 27, 2009 for U.S. Appl. No. 11/129,617.
Notice of Allowance Dated Nov. 9, 2009 for U.S. Appl. No. 11/129,617.

* cited by examiner

SYSTEM AND METHOD FOR MANAGING VERSIONS OF METADATA

CROSS-REFERENCED AND RELATED APPLICATIONS

This application claims the benefit of U.S. Provisional Application Ser. No. 60/571,361 filed on May 14, 2004. This application is related to co-pending U.S. Application Ser. No. 11/129,617 filed on May 13, 2005 entitled "System for Allowing Object Metadata to be Shared Between Cursors for Concurrent Read Write Access," which claims the benefit of U.S. Provisional Application Ser. No. 60/571,362 filed on May 14, 2004. These applications are hereby incorporated by reference in their entireties as if fully set forth herein.

BACKGROUND AND SUMMARY

This invention related to computer systems, more particularly to managing versions of metadata.

Versioned metadata allows for multiple versions of metadata for a given object to exist concurrently on a system. This is required to support the parallel execution of operations which would otherwise be mutually exclusive. For, example, a system cache can serve as a global repository of cached metadata for objects such as tables and indexes. When a request is received to access a resource, the database system converts the request through compilation into a program unit, or cursor. When a program unit accesses an object, a lock can be placed on the metadata for that object. This lock prevents any changes to the metadata so that the program unit can execute the desired operation without mid-execution changes from other program units that may cause the program unit to fail or may invalidate the result. This means that long running program units may lock the metadata for a long period of time, potentially blocking object changes that cause metadata updates even if those updates were known to have no affect on the executing program unit. This inherently limits scalability and performance as all activity on an object must be completed before that object, and consequently, before its metadata, can be modified. A solution is required which will allow programming units to execute while concurrently allowing object updates.

One embodiment of managing versions of metadata includes linking a dependent object for a resource to the most recent metadata version of the resource, maintaining any metadata version while in use, and deleting any metadata version when no longer in use.

In one system embodiment, the versioning infrastructure includes a search and create process, an aging-out process, and a dependency mechanism. In another embodiment the dependency mechanism is not included. The search and create process manages new and obsolete versions of metadata. The aging-out process maintains the obsolete metadata versions in the system while needed. The dependency mechanism allows a client or another object to declare interest in, or dependency on, a metadata object. In another embodiment, a viewing process allows the viewing of any and/or all active versions of a metadata. Further details are described below in the detailed description, drawings and claims.

DETAILED DESCRIPTION OF INVENTION

A system, method, and computer program have been created which allow for the creation and management of versioned metadata. In the following description, for the purposes of explanation, one or more embodiments having specific combinations of elements are set forth in order to provide a thorough understanding of the solution. It will be apparent, however, to one skilled in the art that the embodiments may be practiced without these specific combination of elements.

Versioned metadata allows an the creation of a new version of metadata as needed for execution of an intended operation that would otherwise be prohibited. For example, a client can issue a write request to modify an object. However, if the object is in use the metadata would be locked, preventing object edits. By allowing the creation of an additional version of that object's metadata, the write request can execute. In other words, by using versioned metadata clients are permitted to modify an object even if that object is in use by another client. Program units using the metadata of a modified object can maintain access to the previous version of metadata.

One embodiment of managing versions of metadata includes linking a dependent object to the most recent metadata version of the resource, maintaining the metadata version while in use, and deleting the metadata version when no longer in use.

In one system embodiment, the versioning infrastructure includes a search and create process, an aging-out process, and a dependency mechanism. In another embodiment the dependency mechanism is not included. The search and create process manages new and obsolete versions of metadata. The aging-out process maintains the obsolete metadata versions in the system while needed. The dependency mechanism allows a client or another object to declare interest in, or dependency on, a metadata object. In another embodiment, a viewing process allows the viewing of any and/or all active versions of a metadata.

Figure 1:
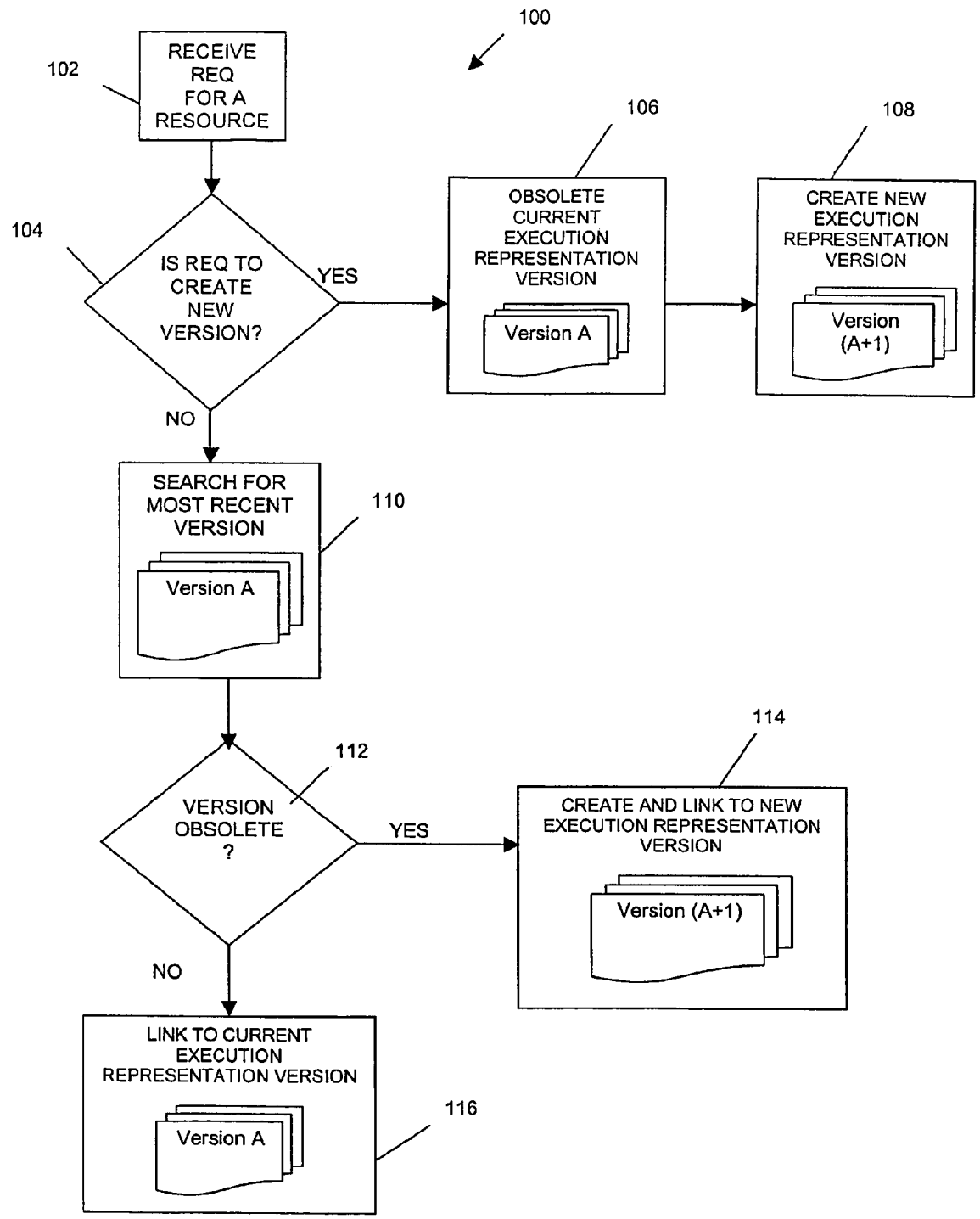
FIG. 1 is a representation of the search and create process.

When an operation is requested for an object, the metadata for the object is accessed. The search and create process details how the appropriate metadata version is accessed. FIG. 1 depicts a representation of the search and create process 100 according to one embodiment. For the purpose of this example, assume that two types of requests may be issued to access the metadata. A first type of request is to create a new version of the metadata (e.g., a write or update operation request). A second type of request will not create a new version of the metadata but uses the current version (e.g., a read operation request). The request may identify a resource, or object, of the system to be operated upon. A request to access a resource occurs at process action (102). It is determined at process action (104) if the request is a request for a new version of the metadata, i.e., a write request. If the request is for a new version, the current version of the metadata is marked obsolete (106), and a new version of metadata is created (108). If it is determined at (104) that the request is not a request for a new version of the metadata, i.e., a read request, then a search (110) is conducted for the most recent version of the metadata. It is determined at process action (112) if the retrieved metadata version has been marked obsolete. If it is determined at process action (112) that the retrieved metadata version has been marked obsolete, then a new version of metadata is created and the request is linked to the new version at process action (114). If it is determined at (112) that the retrieved metadata version has not been marked obsolete, then it can be assumed that the most recent version of the metadata has been found, and the process links the request (116) to the current metadata version.

For example, suppose a request to create a new partition in a table was issued. Process action (104) determines that the request is a request for a new version of metadata. The existing version of the table metadata is marked as obsolete (106) and the new version of the table metadata based on the modified table is created (108).

In another example, suppose a client request to select data in a table is issued. Process action (104) determines that the request is not a request for a new version of metadata. Process action (110) searches for and locates the most recent version of the table metadata. If the metadata version found is not obsolete (112), then it is returned to the client.

In another scenario, the metadata version returned in process action (110) is obsolete. This situation might occur if a previous operation to create a new version had failed, but the operation to obsolete the old previous version has already been performed. Consequently, a new metadata version was never created but the previous version was already marked obsolete. In this case, process action (114) would then create a new metadata version and return it to the client.

Figure 3:
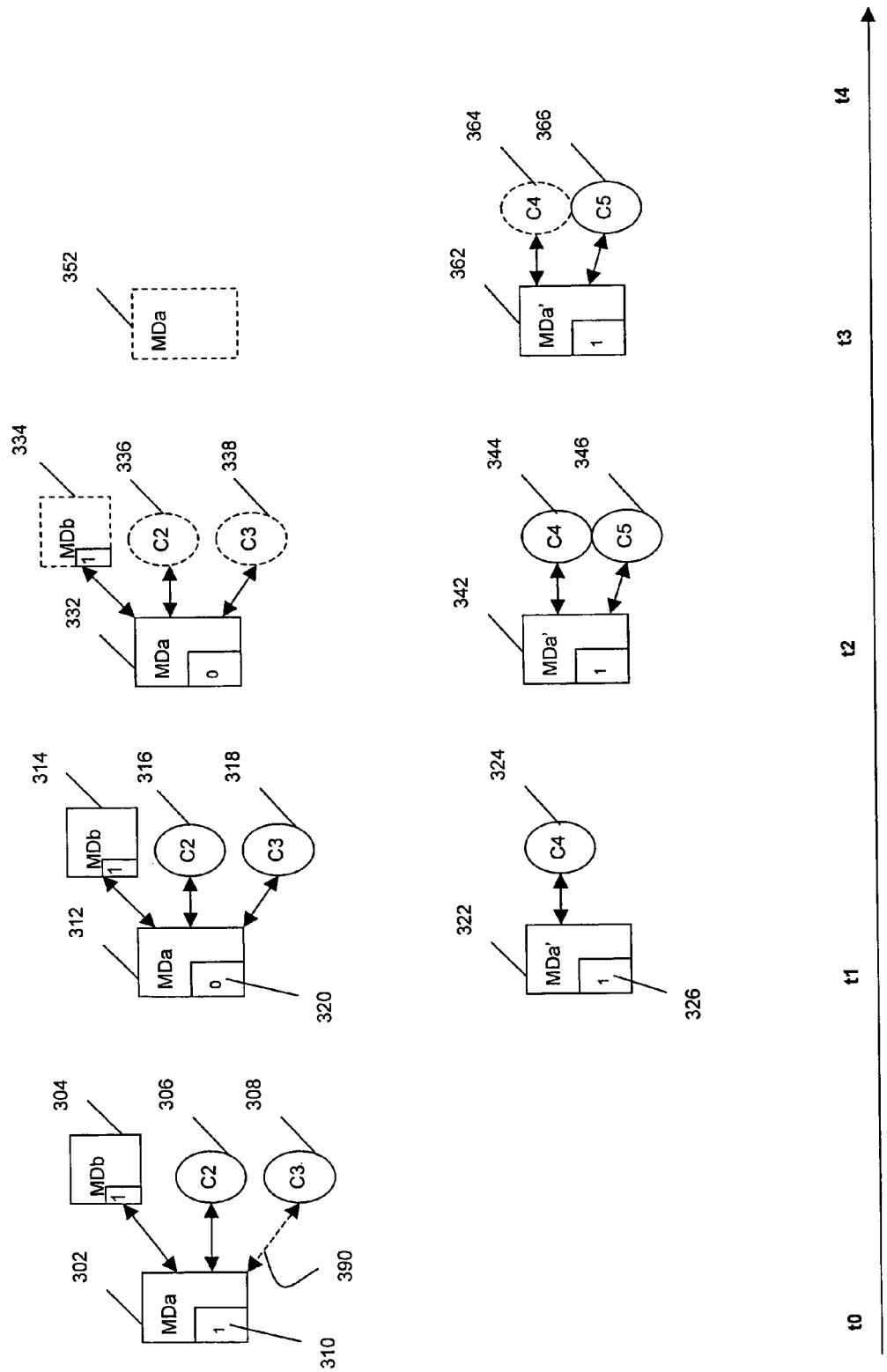
FIG. 3 is a representation of versioned metadata over time.

Using the search and create process 200, a system can have multiple concurrent versions of metadata. FIG. 3 is a representation of concurrent versions of metadata over time according to some embodiments. For purposes of this example, the metadata is represented by rectangular structures labeled MDx, where "x" represent the object that the metadata describes, such as metadata MDa at t0 302, MDb at t0 304, and metadata MDa' at t1 322. Each metadata structure has a "0" or "1" in an inset rectangle in the lower left corner. The inset rectangle represents the current version flag. A "1" in the current version flag indicates the metadata has not been marked obsolete, i.e., is current. A "0" in the current version flag indicates that the metadata has been marked obsolete. The structures connected to metadata MDa by double arrow lines represent objects, linked to the metadata. In this example, another metadata is linked to metadata MDa, as are two cursors, the ovals C2 306 and C3 308. Although cursors C2 and C3 are shown as ovals and metadata are shown as rectangles, cursors are an example of metadata and may be shown by the same type of drawing element. Cursors having dashed lines indicate the cursor has completed its operation and has become freeable. Cursors removed from the drawing over time indicate the cursor is freed. Cursors added to the drawing over time indicate a new client request was issued and the resulting cursor was linked to the metadata. Metadata shown with dashed lined indicates the metadata has become freeable. Metadata removed from the drawing over time indicates the metadata was no longer needed and has been freed.

Figure 4:
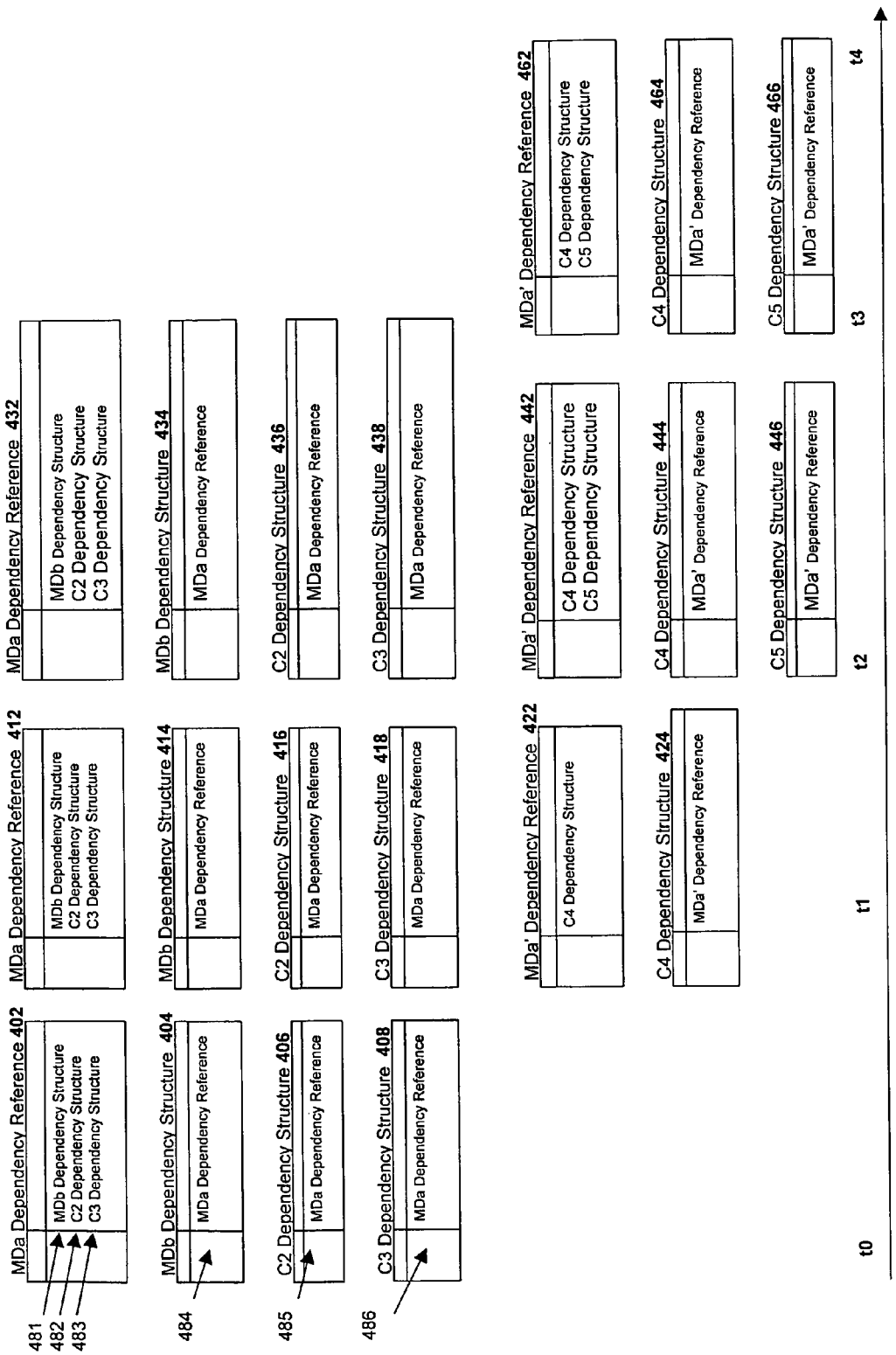
FIG. 4 is a representation of the dependency mechanism over time.

In some embodiments, linked objects are tracked using a dependency mechanism. FIG. 4 is a representation of an embodiment of the dependency mechanism of versioned metadata over time. The dependency mechanism provides data storage devices containing information regarding the relationship between parent objects and child objects. The dependency mechanism storage devices are represented by rectangular structures containing data fields. Each parent object stores dependency information in a Dependency Reference and each child object stores dependency information in a Dependency Structure. For example, each parent Dependency Reference contains a pointer to the Dependency Structure of each child (e.g., cursor or metadata) with which it is linked. Each child Dependency Structure contains a pointer to the Dependency Reference with which it is linked. An object can be both a parent and a child and can therefore have both a Dependency Reference and a Dependency Structure. This will become more clear as the figures are explained further.

FIG. 3 and FIG. 4 will be discussed in the following paragraphs in relation to the creation and linking process shown in FIG. 1.

At time t0, three clients have requested access to object "a". For each request the search and create process 100 performs the following: searches in process action (110) and finds metadata version MDa 302, determines that metadata MDa 302 is not obsolete in process action (112) but is the current most recent metadata version indicated by the "1" in the current version flag 310, and links the object to the metadata in process action (116). Metadata MDb 304, and cursors C2 306, and C3 308 are shown linked to the current version of MDa in the representation of an embodiment shown in FIG. 3. At this point there are three child objects MDb 304, C2 306, and C3 308 acting upon object "a", and accessing metadata MDa 302. The three objects will have access to metadata MDa until they complete their operation. If another read request comes in at this time, its object would also be linked to metadata MDa 302 as a result of the search and create process 100.

In another embodiment, MDb 304 and cursor C2 306 are currently accessing object MDa 302 when another read request to access object "a" such as cursor C3 308 is received. Since it is a read request and does not modify the metadata, C3 308 would share the current version of Mda. In this instance, cursor C3 308 has not yet accessed object "a" but is in a queue waiting to obtain access as indicated by the dashed link 390 to MDa 302. In other words, cursor C3 has declared interest in metadata MDa using the dependency mechanism but is waiting to obtain an active link and begin executing. In yet another embodiment, nested linking is permitted. For example, MDb 304, C2 306, and C3 308 may have another object linked to them.

Also at time t0, the Dependency Reference for parent MDa 402 contains pointers 481, 482, and 483 to each of the child dependency structures: MDb Dependency Structure 404, C2 Dependency Structure 406, and the C3 Dependency Structure 408, respectively. Each of MDb Dependency Structure 404, C2 Dependency Structure 406, and C3 Dependency Structure 408 contain a pointer, 484, 485, and 486 respectively, to the MDa Dependency Reference 402 for parent object metadata MDa.

At time t1, all three objects MDb 314, C2 316, and C3 318 remain linked to MDa 312. The MDa Reference at t1 412 and child Dependency Structures 414, 416, and 418 remain unchanged. However, a client requested for a new version of metadata such as C4 324, was received in process action (104), i.e., a request to modify object "a". As a result, metadata version MDa at time t1 312 is marked obsolete in process action (106) and a new metadata version MDa' 322 is created in process action (108). Current version flag 320 contains a "0" showing that metadata version MDa 312 is obsolete and is no longer the current most recent metadata version. Metadata version MDa' 322 is shown at time t1 in FIG. 3 with a "1" in the current version flag 326, indicating that metadata MDa' 322 is not obsolete but is the current most recent metadata version. Since metadata MDa' is the most recent not obsolete metadata, cursor C4 324 is linked to metadata MDa' 322. Along with a new metadata and cursor, also created are new parent object MDa' Dependency Reference 422 containing the pointer to the child C4 Dependency Structure 424, and child C4 Dependency Structure 424 containing the pointer to the parent MDa' Dependency Reference 422.

At this point there is a current metadata version MDa' 322, and an obsolete metadata version MDa 312. Objects MDb 314, C2 314 and C3 318 will maintain access to the obsolete metadata 312 until each is finished executing, or no longer needs to access the metadata. Cursor C4 324 will maintain access to the current metadata version 322 until C4 is finished executing. No new client requests will obtain access to the obsolete metadata 312. All client requests will be linked to metadata MDa'322 by the search and create process 100 (unless another request for a new metadata version is received). Multiple versions of metadata can be created in this environment, and each one would be maintained while needed.

At time t2, objects MDb 334, C2 336 and C3 338 are finished executing. They are unlocked, and no longer need access to MDa 332, although they still maintain a dependency on it. When an object having no dependents is no longer in use, it is marked freeable. As such, each object linked to MDa is marked freeable as illustrated in FIG. 3 by the dashed lines of the child objects MDb 334, C2 336, and C3 338. Since Objects MDb, C2 and C3 still depend on metadata MDa 332, they are described as freeable dependents and are subject to the aging-out process, process 200 shown in FIG. 2. Process 200 is described later. In addition, no new cursors are linked to version MDa 332 because MDa is not the current metadata version and it is marked obsolete.

FIG. 3 at time t2 also depicts that a client requested a resource in search and create process 100 that is not a request for a new version (104). The resulting child, cursor C5 346 is linked to metadata version MDa' 342 in process action (116) because MDa' 342 is the most recent metadata version (110) that is not obsolete (112). Metadata version MDa' 342 shows cursor C4 344 remains linked and new cursor C5 346 is linked. As such, parent Mda' Dependency Reference at t2 442 contains pointers for the child cursor C4 Dependency Structure 444, and the new child cursor C5 Dependency Structure 446. Each of cursor C4 Dependency Structure 444 and cursor C5 Dependency Structure 446 contain a pointer for the parent object, MDa' Dependency Reference 442.

At this point metadata Mda' 342, is the most recent metadata version, is not obsolete, and has two active dependents, C4 344 and C5 346. Metadata Mda 332 is obsolete and has no active dependents. There are three freeable dependents, MDb 334, C2 336, and C3 338 which will be handled by the aging-out process described further below.

At time t3, version MDa' 362 is shown as the current metadata version with cursor C5 364 linked. The child C5 Dependency Structure 466 contains the pointer for the parent MDa' Dependency Reference 462. And the parent MDa' Dependency Reference 462 contains the pointer for the child C5 Dependency Structure 466. Cursor C4 364 is no longer executing and is marked freeable, shown by dashed lines in FIG. 3. FIG. 4 also shows the pointer to MDa' Dependency Reference in the C4 Dependency Structure 464 and the pointer to the C4 Dependency Structure in the MDa' Dependency Reference 462. C4 364 and metadata MDa 352 have been marked freeable as indicated by the dashed structures. Children MDb, C2, and C3 have been freed via the aging-out process 200 as indicated by the removal of them from the drawing. As such, the MDb, C2, and C3 memory can be reallocated as needed.

Figure 2:
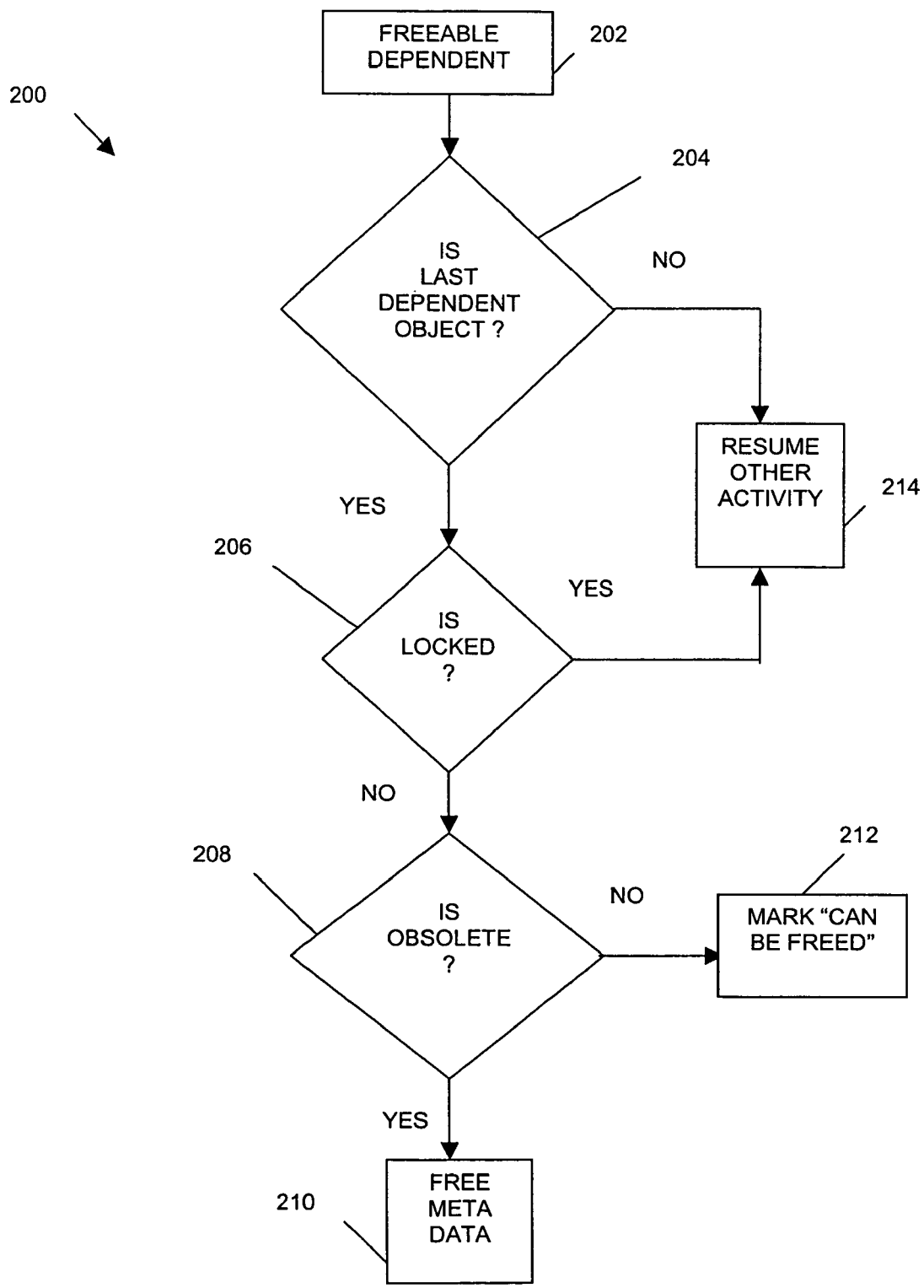
FIG. 2 is a representation of the aging-out process.

As mentioned previously, dependency structures are used to track the relationship between parent and child objects. A Dependency Reference is used by the parent to track each child object. A child Dependency Structure is used by each child to track each parent. The pointers in the dependency structures indicate interest or dependency. Each version of the metadata remains in the system while any client is interested in it or dependent on it. FIG. 2 depicts the aging-out process 200 that is triggered upon a dependent becoming freeable. For example, aging-out process 200 would be triggered in time t2 when objects MDb, C2, and C3 become freeable dependents, and in time t3 when cursor C4 becomes a freeable dependent.

At time t2, objects MDb, C2 and C3 become freeable dependents. In this example, assume they become freeable dependents in written order. The first one to become a freeable dependent, MDb, will trigger the metadata aging-out process 200 at process action (202). The process determines if the freeable dependent was the last dependent of the metadata version in process action (204). Since there are three objects with a dependency on MDa, the first two times through process 200, process action (204) determines that objects MDb and C2 are not the last dependents and the system will resume other activities (214). When cursor C3, the third and final dependent, is marked freeable and goes though the metadata aging-out process 200, process action (204) determines that it is the last dependent. Process action (206) determines if the metadata is locked by any other object. If the metadata is locked, the system will resume other processing activities (214). In this example the metadata is not locked by another object, and so the process continues. Process action (208) determines if the metadata is obsolete. If it is not obsolete the metadata is marked "can be freed" in process action (212). Another object could request a resource and still be linked to a metadata that is marked "can be freed" because it is still the most recent metadata version that has not been marked obsolete. In this instance, metadata MDa is obsolete, and is freed in process action (210). Methods for handling freed metadata resources are performed by the resource allocation subsystem and are known to those of ordinary skill in the art.

In another embodiment, a viewing mechanism provides a client a way to view of all metadata versions obsolete or not.

System Architecture Overview

Figure 5:
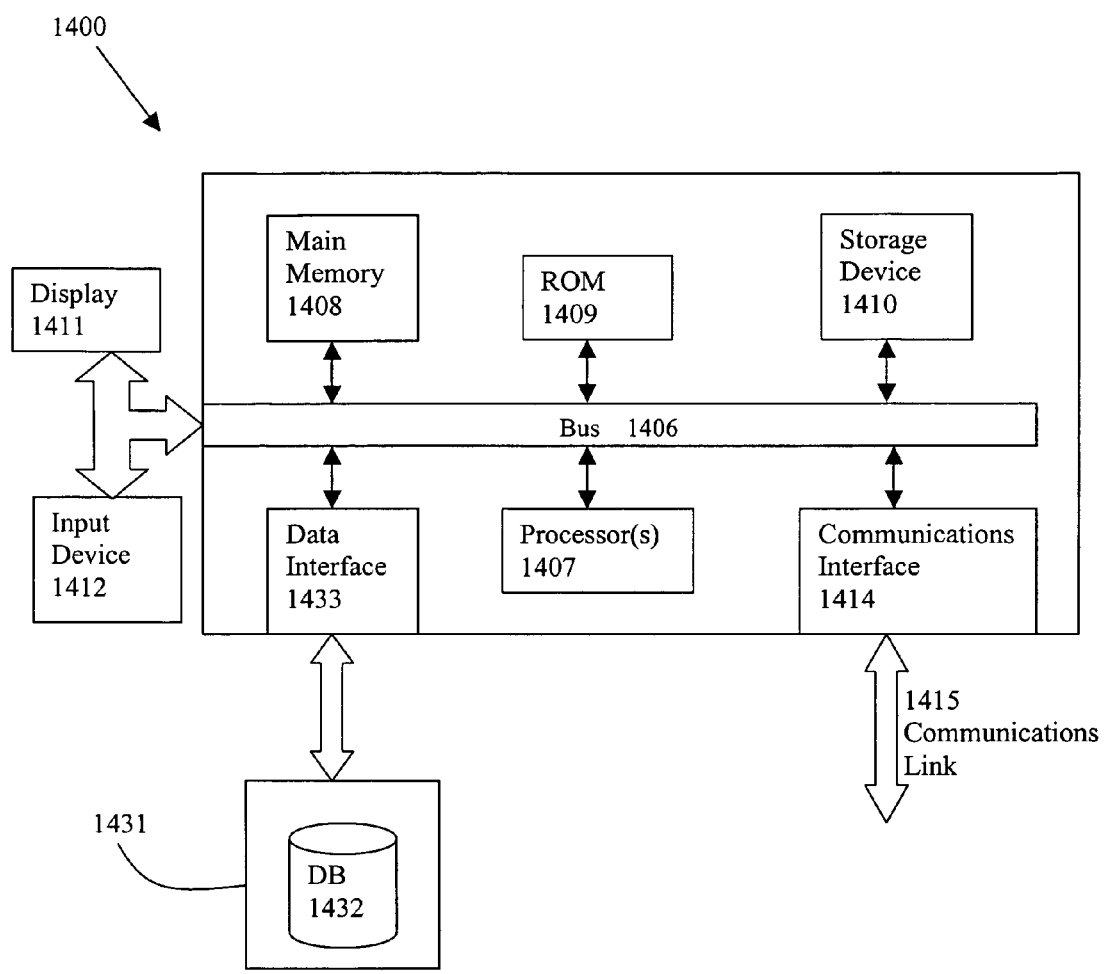
FIG. 5 is a representation of a system in which managing transient versions of metadata takes place.

The execution of the sequences of instructions required to practice the invention may be performed in some embodiments by a computer system 1400 as shown in FIG. 5. In an embodiment, execution of the sequences of instructions required to practice the invention is performed by a single computer system 1400. According to other embodiments, two or more computer systems 1400 coupled by a communication link 1415 may perform the sequence of instructions in coordination with one another. In order to avoid needlessly obscuring the explanation, a description of only one computer system 1400 will be presented below; however, it should be understood that any number of computer systems 1400 may be employed.

A computer system 1400 according to an embodiment will now be described with reference to FIG. 5, which is a block diagram of the functional components of a computer system 1400. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be the internet in which case the communication interface 1414 may be a telephone line, a cable or a wireless modem, or the communication link 1415 may be a LAN, in which case the communication interface 1414 may be a LAN card, or the communication link 1415 may be a PSTN, in which case the communication interface 1414 may be an integrated services digital network (ISDN) card or a modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

We claim:

1. A computer implemented method for managing versions of metadata on a system, the method comprising:

receiving a first set of one or more first requests to operate on an object, wherein a first metadata version is associated with the object;

fulfilling the first set of one or more first requests by performing one or more first database operations associated with the one or more first requests against the object;

while the first metadata version associated with the object is being maintained for the one or more first requests, receiving a second set of one or more second requests to operate on the object, wherein a second metadata version is associated with the object, wherein the first metadata version is obsolete and the second metadata version is not obsolete, the first metadata version and second metadata version concurrently exist for the object on the system so that the one or more first requests finish the one or more first database operations using the first metadata version while the one or more second requests uses the second metadata version;

fulfilling the second set of one or more second requests by performing one or more second database operations associated with the one or more second requests against the object;

maintaining, by using a processor, the first metadata version and the second metadata version with a dependency reference to track dependent objects accessing the first metadata version, wherein the act of maintaining comprises: marking a state of the first metadata version to indicate a lack of the dependent objects;

deleting the first metadata version associated with the object if the state of the first metadata version is marked so that the first metadata version no longer needs to be maintained for the first set of one or more first requests to perform the one or more first database operations associated with the one or more first requests; and storing the second metadata version in a volatile or non-volatile computer usable medium or displaying the second metadata version on a display device.

2. The computer implemented method of claim 1, further comprising: linking a dependent object to the second metadata version comprises:
   determining that at least one of the one or more second requests is a write request;
   modifying a persistent metadata version based at least in part upon the write request; and
   creating a new metadata version based at least in part upon the modified persistent metadata.

3. The computer implemented method of claim 1, further comprising: linking a dependent object to the second metadata version comprises:
   determining that at least one of the one or more second requests is a read request;
   locating the second metadata version for the resource; and
   determining that the second metadata version for the resource is not obsolete.

4. The computer implemented method of claim 1, further comprising:
   linking a dependent object to the second metadata version comprises:
   determining that at least one of the one or more second requests is a read request; and
   creating the second metadata version.

5. The computer implemented method of claim 1, further comprising:
   allocating memory consumed by the second metadata version;
   determining that the second metadata version is not obsolete; and
   continuing to use previously allocated memory consumed by the second metadata version.

6. The computer implemented method of claim 1, further comprising:
   allocating memory consumed by the second metadata version;
   determining that the first metadata version has no linked dependent objects;
   determining that the first metadata version is obsolete; and
   releasing previously allocated memory consumed by the first metadata version.

7. The computer implemented method of claim 6, further comprising:
   marking a state of the first metadata version to indicate a lack of linked dependent objects.

8. A system for managing versions of metadata, comprising:
   a processor configured for:
   receiving a first set of one or more first requests to operate on an object, wherein a first metadata version is associated with the object;
   fulfilling the first set of one or more first requests by performing one or more first database operations associated with the one or more first requests against the object;
   while the first metadata version associated with the object is being maintained for the one or more first requests, receiving a second set of one or more second requests to operate on the object, wherein a second metadata version is associated with the object,
   wherein the first metadata version is obsolete and the second metadata version is not obsolete, the first metadata version and second metadata version concurrently exist for the object on the system so that the one or more first requests finish the one or more first database operations using the first metadata version while the one or more second requests uses the second metadata version;
   fulfilling the second set of one or more second requests by performing one or more second database operations associated with the one or more second requests against the object;
   maintaining, by using a processor, the first metadata version and the second metadata version with a dependency reference to track dependent objects accessing the first metadata version, wherein the act of maintaining comprises: marking a state of the first metadata version to indicate a lack of the dependent objects;
   deleting the first metadata version associated with the object if the state of the first metadata version is marked so that the first metadata version no longer needs to be maintained for the first set of one or more first requests to perform the one or more first database operations associated with the one or more first requests; and
   a volatile or non-volatile computer usable medium for storing the second metadata version or a display device for displaying the second metadata version.

9. The system of claim 8, wherein the processor is further configured for:
   determining that at least one of the one or more second requests is a write request;
   modifying a persistent metadata version based at least in part upon the write request; and
   creating a new metadata version based at least in part upon the modified persistent metadata.

10. The system of claim 8, wherein the processor is further configured for:
   determining that at least one of the one or more second requests is a read request;
   locating the second metadata version for the resource; and
   determining that the second metadata version for the resource is not obsolete.

11. The system of claim 8, wherein the processor is further configured for:
   determining that at least one of the one or more second requests for the resource is a read request; and
   creating the second metadata version.

12. The system of claim 8, wherein maintaining further comprises:
   allocating memory consumed by the second metadata version;
   determining that the second metadata version is not obsolete; and
   continuing to use previously allocated memory consumed by the second metadata version.

13. The system of claim 8, wherein the processor is further configured for:
   allocating memory consumed by the second metadata version;
   determining that the first metadata version has no linked dependent objects;
   determining that the first metadata version is obsolete; and
   releasing previously allocated memory consumed by the first metadata version.

14. The system of claim 13, wherein the processor is further configured for:
   marking a state of the first metadata version to indicate a lack of the linked dependent objects.

15. A computer program product embodied on volatile or non- volatile computer usable medium, the computer usable medium having stored thereon a sequence of instructions which, when executed by a processor, causes the processor to execute a method for managing versions of metadata on a system, the method comprising:

receiving a first set of one or more first requests to operate on an object, wherein a first metadata version is associated with the object;

fulfilling the first set of one or more first requests by performing one or more first database operations associated with the one or more first requests against the object;

while the first metadata version associated with the object is being maintained for the one or more first requests, receiving a second set of one or more second requests to operate on the object, wherein a second metadata version is associated with the object, wherein the first metadata version is obsolete and the second metadata version is not obsolete, the first metadata version and second metadata version concurrently exist for the object on the system so that the one or more first requests finish the one or more first database operations using the first metadata version while the one or more second requests uses the second metadata version;

fulfilling the second set of one or more second requests by performing one or more second database operations associated with the one or more second requests against the object;

maintaining, by using a processor, the first metadata version and the second metadata version with a dependency reference to track dependent objects accessing the first metadata version, wherein the act of maintaining comprises: marking a state of the first metadata version to indicate a lack of the dependent objects;

deleting the first metadata version associated with the object if the state of the first metadata version is marked so that the first metadata version no longer needs to be maintained for the first set of one or more first requests to perform the one or more first database operations associated with the one or more first requests; and storing the second metadata version or displaying the second metadata version on a display device.

16. The computer program product of claim 15, further comprising:

linking a dependent object to the second metadata version comprises:

determining that at least one of the second one or more requests is a write request;

modifying a persistent metadata version based at least in part upon the write request; and creating a new metadata version based at least in part upon the modified persistent metadata.

17. The computer program product of claim 15, further comprising:

linking a dependent object to the second metadata version comprises:

determining that at least one of the second one or more requests is a read request;

locating the second metadata version for the resource; and determining that the second metadata version for the resource is not obsolete.

18. The computer program product of claim 15, further comprising:

linking a dependent object to the second metadata version comprises:

determining that at least one of the second one or more requests is a read request; and creating the second metadata version.

19. The computer program product of claim 15, further comprising:

allocating memory consumed by the second metadata version;

determining that the second metadata version is not obsolete; and continuing to use previously allocated memory consumed by the second metadata version.

20. The computer program product of claim 15, further comprising:

allocating memory consumed by the second metadata version;

determining that the first metadata version has no linked dependent objects;

determining that the first metadata version is obsolete; and releasing previously allocated memory consumed by the first metadata version.

21. The computer program product of claim 20, the method further comprising:

marking a state of the first metadata version to indicate a lack of linked dependent objects.

22. A system for managing obsolete versions of metadata comprising:

storage for storing metadata versions of an object, the storage is associated with a search and create process to locate and create the metadata versions for the object; and a processor for executing an aging-out process to maintain or release obsolete versions of metadata using a dependency reference to track dependent objects accessing the metadata versions, the aging-out process comprises:

determining if one of the metadata versions of the object has any dependent objects that are in use by marking a state of the one of the metadata versions to indicate a lack of the dependent objects; and deleting the one of the metadata versions of the object if the dependent objects are no longer in use after completing a request to perform one or more database operations corresponding to the dependent object.

23. The system of claim 22, further comprising a viewing module to view any active metadata versions.

24. A computer program product embodied on volatile or non-volatile computer usable medium, the computer usable medium having stored thereon a sequence of instructions which, when executed by a processor, causes the processor to execute a method for managing obsolete versions of metadata on a system, the method comprising:

searching and creating to locate and create metadata versions for an object;

aging-out obsolete versions of metadata using a dependency reference to track dependent objects accessing the metadata versions, the act of aging-out comprises:

determining if one of the metadata versions of the object has any dependent objects that are in use by marking a state of the one of the metadata versions to indicate a lack of the dependent objects; and deleting the one of the metadata versions of the object if the dependent objects are no longer in use after completing a request to perform one or more database operations corresponding to the dependent object; and storing the metadata versions or displaying the metadata versions on a display device.

25. The computer program product of claim 24, the method further comprising:

viewing any active metadata versions.

26. A computer implemented method for managing obsolete versions of metadata on a system comprising:

searching and creating to locate and create metadata versions for an object;

aging-out obsolete versions of metadata with a dependency reference to track dependent objects accessing the metadata versions, the act of aging-out comprises:

determining if one of the metadata versions of the object has any dependent objects that are in use by marking a state of the one of the metadata versions to indicate a lack of the dependent objects; and deleting the one of the metadata versions of the object if the dependent objects are no longer in use after completing a request to perform one or more database operations corresponding to the dependent object; and storing the metadata versions in a volatile or non-volatile computer usable medium or displaying the metadata versions on a display device.

27. The computer implemented method of claim 26, further comprising:

viewing any active metadata versions.

* * * * *